United States Patent [19]
Crowley

[11] Patent Number: 5,440,997
[45] Date of Patent: Aug. 15, 1995

[54] MAGNETIC SUSPENSION TRANSPORTATION SYSTEM AND METHOD

[76] Inventor: Walter A. Crowley, 861 E. Shore Dr., Dugualla Bay Heights, Oak Harbor, Wash. 98277

[21] Appl. No.: 127,315

[22] Filed: Sep. 27, 1993

[51] Int. Cl.⁶ ............................................. B61L 13/04
[52] U.S. Cl. .................................................. 104/283
[58] Field of Search ............... 104/281, 282, 283, 284, 104/286

[56] References Cited

U.S. PATENT DOCUMENTS

| | | |
|---|---|---|
| 3,158,765 | 11/1964 | Polgreen . |
| 3,780,667 | 12/1973 | Miericke et al. . |
| 3,834,317 | 9/1974 | Miericke . |
| 3,899,979 | 8/1975 | Godsey, Jr. . |
| 3,903,809 | 9/1975 | Miericke et al. . |
| 3,951,074 | 4/1976 | Cooper . |
| 4,356,772 | 11/1982 | van der Heide ............. 104/283 |
| 4,711,182 | 12/1987 | Alexandrov et al. ........ 104/283 |
| 4,805,761 | 2/1989 | Totsch . |
| 5,165,347 | 11/1992 | Wagner . |
| 5,243,919 | 9/1993 | Ninomiya ..................... 104/283 |

FOREIGN PATENT DOCUMENTS

| | | | |
|---|---|---|---|
| 0123719 | 5/1988 | Japan ............. | 104/281 |
| 0099408 | 4/1989 | Japan ............. | 104/283 |
| 1225172 | 4/1988 | U.S.S.R. ........ | 104/281 |

Primary Examiner—Mark T. Le
Attorney, Agent, or Firm—Hughes, Multer & Schacht

[57] ABSTRACT

A magnetic suspension system for a vehicle/rail transportation system, where interacting sets of magnets are positioned on the vehicle and the rail to suspend the vehicle from the rail and permit low friction movement along the rail. Also, laterally facing air castors are provided for lateral support. Magnet sets are provided in both linking and opposing relationship to provide support and (in at least some embodiments) prevention of lift off.

20 Claims, 5 Drawing Sheets

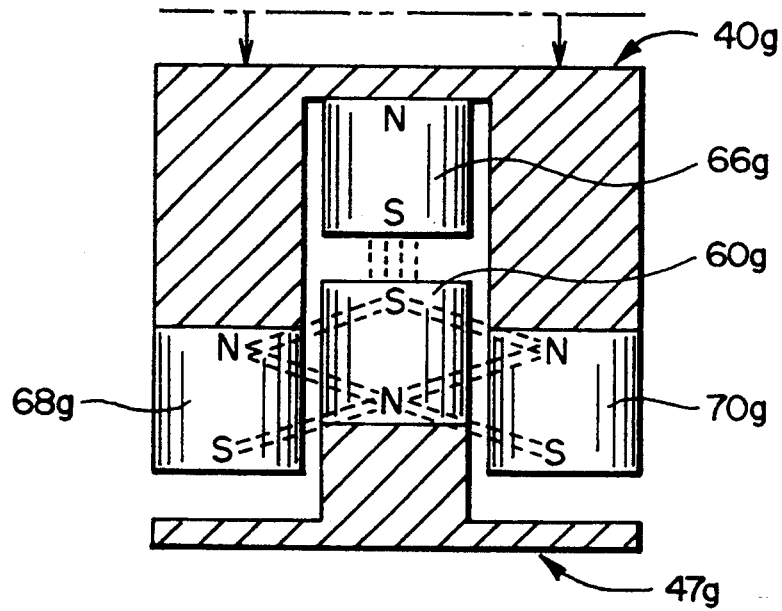
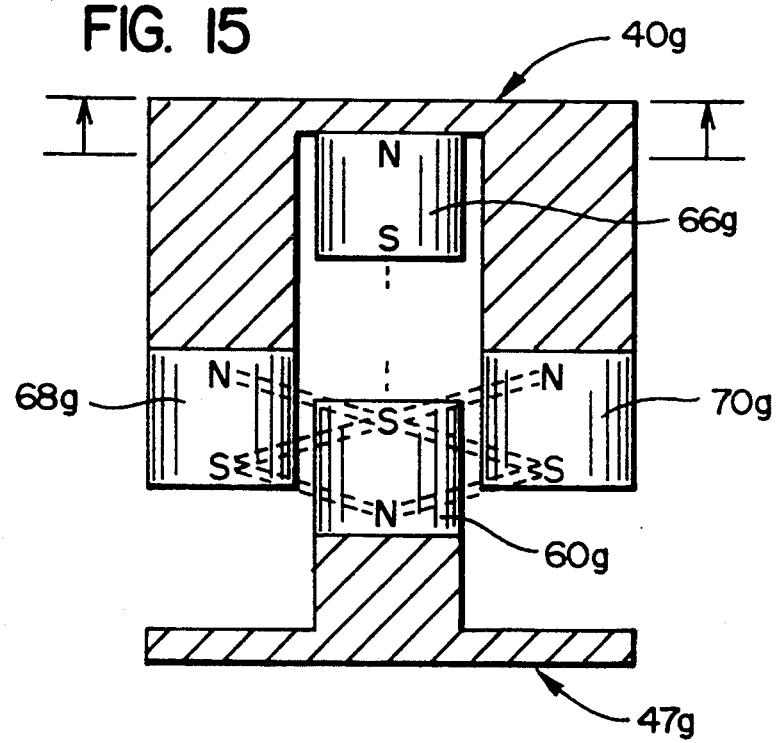

MAGNETIC SUSPENSION TRANSPORTATION SYSTEM AND METHOD

FIELD OF THE INVENTION

The present invention relates to a transportation system where a vehicle is magnetically supported from a track along which it travels, and more particularly to such a system where the interacting components are arranged for improved support and/or positioning of the vehicle relative to the track.

BACKGROUND ART

In recent decades, there have been various concepts for magnetically supporting vehicles or objects for movement along a track or other conveying device from one location to another. A search of the U.S. Patent literature has disclosed a number of these, described in the following patents:

U.S. Pat. No. 5,165,347 (Wagner) shows a "Vehicle Levitation and Guidance System" particularly adapted for small scale models of vehicles, such as trains, cars, etc. There are magnetic strips attached to the bottom of the train and magnets in the track, to create opposing magnetic fields that lift the train above the track. To guide the train, there are provided center pins 36 that extend downwardly into a center channel formed in the tracks. The pins apparently physically engage the sidewalls of the channel to keep the train properly aligned.

U.S. Pat. No. 4,805,761 (Totsch) shows a magnetic conveyor system to transport integrated circuits in a clean-controlled environment. There is a stationary bed or rail having two sets of longitudinally aligned laterally spaced magnets on opposite sides at the bottom of the bed to provide support, and two Teflon guides acting against Teflon runners on the side walls to provide lateral positioning. Then the conveying platform has two similar side strips of magnets that provide the lifting force. There is a magnetic drive piston which is positioned for movement along a center tube 28. This interacts with center magnets 52 that are mounted on the platform so that when there is movement of the drive magnet (called a "piston"), the tray is caused to move along the rail.

U.S. Pat. No. 3,951,074 (Cooper) shows a system of suspending a "high speed terrestrial vehicle" that is suspended by magnets. The magnets are provided in the vehicle so that there are two sets of alternatively positioned north and south magnets longitudinally aligned on the lower part of the vehicle. Each set of magnets along opposite sides of the vehicle is positioned in a related U shaped track 13 made of a continuous nonferromagnetic electrically conductive material, so that as the vehicle is propelled, such as by jet engines, and reaches a high speed, eddy currents are induced in the track by the moving magnetic fields. The eddy currents set up magnetic fields which are directly opposite and which repel the magnets 15 in the vehicle. This provides the lift.

U.S. Pat. No. 3,834,317 (Miericke) shows a "magnetic moving vehicle suspension", and as can be seen in FIG. 1, there are in the track four magnetic loops which appear to generate opposing magnetic fields. Then the vehicle itself that is to travel so as to be suspended magnetically has two horizontal laterally spaced plates 16 and 17 (which are electrically conductive but nonferromagnetic), and also a vertically aligned longitudinal center plate 18 which is also of electrically nonferromagnetic material. Additional magnetic loops are provided at upper plate locations at 26 and 28, if these are needed. It would appear that eddy currents are formed in the plates 16, 17, 18 and 26–28 when there is relative movement between the vehicle and the track.

U.S. Pat. Nos. 3,903,809 and 3,780,667 are also patents to Miericke, and these show magnetic suspension systems rather similar to that discussed above relative to U.S. Pat. No. 3,834,317.

U.S. Pat. No. 3,899,979 (Godsey, Jr.) shows a magnetic suspension system for trains and the like, where there are permanent magnets and also electro magnets. Energization of the electro magnets is used mainly to provide an extra boost to keep the air gap clearance substantially constant in accordance with varying gravitational loads on the vehicle.

U.S. Pat. No. 3,158,765 (Polgreen) shows a magnetic support transportation system where poles of like polarity are laced one above the other to provide support.

SUMMARY OF THE INVENTION

The vehicle track transportation system of the present invention comprises a track having a longitudinal axis aligned with a path of travel along the track, a vertical axis, and a horizontal axis, and also a vehicle having a longitudinal axis, a vertical axis and a lateral axis, and arranged to be magnetically supported from the track for movement along the track path of travel.

The track has a track magnetic support means having at least a north pole means and a south pole means. There is a vehicle magnetic support means having at least a north pole means and a south pole means. The vehicle has an operating position adjacent to the track where the vehicle is properly positioned so as to be adequately supported from the track by the two magnetic support means, and positioned for movement along the track.

The two magnetic support means have linking magnetic portions positioned relative to one another in a manner that, with the vehicle in the operating position, at least a north or south pole linking magnetic portion of one of said magnetic support means is laterally spaced from, but adjacent to, a south or north pole linking magnetic portion, respectively, of the other of said magnetic support means, with the laterally spaced and adjacent linking magnetic portions being generally horizontally aligned with one another within a vertical support region where, with the vehicle at a lower part of said region, magnetic lines of force between the adjacent pole portions exert an upward force on the vehicle. With the vehicle at an upper end of said region, the magnetic lines of force exert a downward force on said vehicle or at least a lesser upward force on said vehicle.

In some preferred embodiments, the two magnetic support means have opposing magnetic portions vertically aligned with one another and having like pole portions positioned in opposing relationship with one another to exert a vertical lifting force on the vehicle magnetic support means.

Also in preferred embodiments, the two magnetic support portions are arranged so that both north and south pole linking magnetic portions of the one of said magnetic support means are laterally spaced from, but adjacent to, both south and north pole linking magnetic portions of the other of said magnetic support means in magnetic linking relationship.

In one arrangement, the one of the magnetic support means comprises first and second magnetic sections spaced laterally from one another, and the other of the magnetic support means comprises a third magnetic section positioned between and adjacent to said first and second magnetic sections, in a manner that south pole portions of the first and second sections are positioned adjacent to a north pole portion of the third magnetic section, and north pole portions of the first and second sections are laterally adjacent to a south pole portion of the third section. In addition, in a further preferred form, there is a fourth magnetic section mounted to one or the other of the magnetic support means in a manner to be in opposing relationship to the other of said one or the other of said magnetic support means. In one form, the fourth magnetic section is positioned to be in opposing relationship to the third magnetic section. In another form, there is a fifth magnetic section, and the fourth and fifth magnetic sections are in opposing relationship to the first and second magnetic sections.

As another feature of the present invention, the vehicle is provided with air castor means comprising an air plenum means having a plenum to receive pressurized air, and a peripheral skirt around the plenum. The track has a longitudinally extending wall means providing a lateral support rail surface having a vertical alignment component. The system is arranged so that with the vehicle in the operating position relative to the track, the skirt portion of the air castor is positioned adjacent to the lateral support surface, with pressurized air in the plenum flowing outwardly between said skirt means and the lateral support surface so as to position the vehicle relative to said track. In the preferred form, there are two of the air castor means positioned oppositely from one another, and also two wall means to interact with respective ones of the two air castor means to provide lateral support and positioning of the vehicle. Desirably, on each side of the vehicle there is a plurality of air casters spaced both vertically and longitudinally for roll and yaw stability.

In another embodiment, the one of the magnetic support means comprises at least a single first magnetic section having laterally spaced north and south pole portions, and the other of said magnetic support means comprises at least a second magnetic section having laterally spaced north and south pole portions positioned in laterally spaced linking relationship with the north and south pole portions of the first magnetic section. In a further preferred form, there is a plurality of the first magnetic sections and a plurality of the second magnetic sections spaced laterally from one another in linking relationship.

Desirably, at least one of the two magnetic support means comprises a permanent magnet means, and more specifically, in a preferred form, a ceramic magnetic support means.

In a further preferred form, one of the magnetic support means comprises first and second magnetic support sections spaced laterally from one another, and a third magnetic support section being positioned between the first and second magnetic support sections, but spaced vertically therefrom. The other of the magnetic support means comprises a fourth magnetic section located between the first and second magnetic sections with its poles positioned so as to be in linking relationship with the first and second magnetic support sections, and in opposing relationship to the third magnetic support section.

In a further form, the one of said magnetic support means comprises first and second laterally spaced magnetic support sections. The other of the magnetic support means comprises third and fourth magnetic support sections vertically spaced from, and in magnetically opposing relationship with, said first and second magnetic support sections. The other of the magnetic support means comprises at least one fifth magnetic section laterally spaced relative to said first and second magnetic sections and in linking relationship with at least one of said first and second magnetic support sections. Desirably, there is a plurality of the fifth magnetic support sections in linking relationship with said first and second magnetic support sections.

In the method of the present invention, a system is provided as described above, and the vehicle is positioned in the track so as to provide the linking magnetic relationships and the opposing magnetic relationships as described above.

Other features will become apparent from the following detailed description.

BRIEF DESCRIPTION OF THE DRAWINGS

FIG. 14 is a transverse view of a magnetic suspension system similar to that shown in FIG. 1, except with the arrangement of the magnets reversed, and with the vehicle being heavily loaded, this figure illustrating the magnetic forces of the system, and FIG. 15 is a view similar to FIG. 14, but showing a situation where the vehicle is being moved upwardly from the track, and illustrating the forces which tend to restore the vehicle to the intermediate position;

DESCRIPTION OF THE PREFERRED EMBODIMENTS

Figure 1:
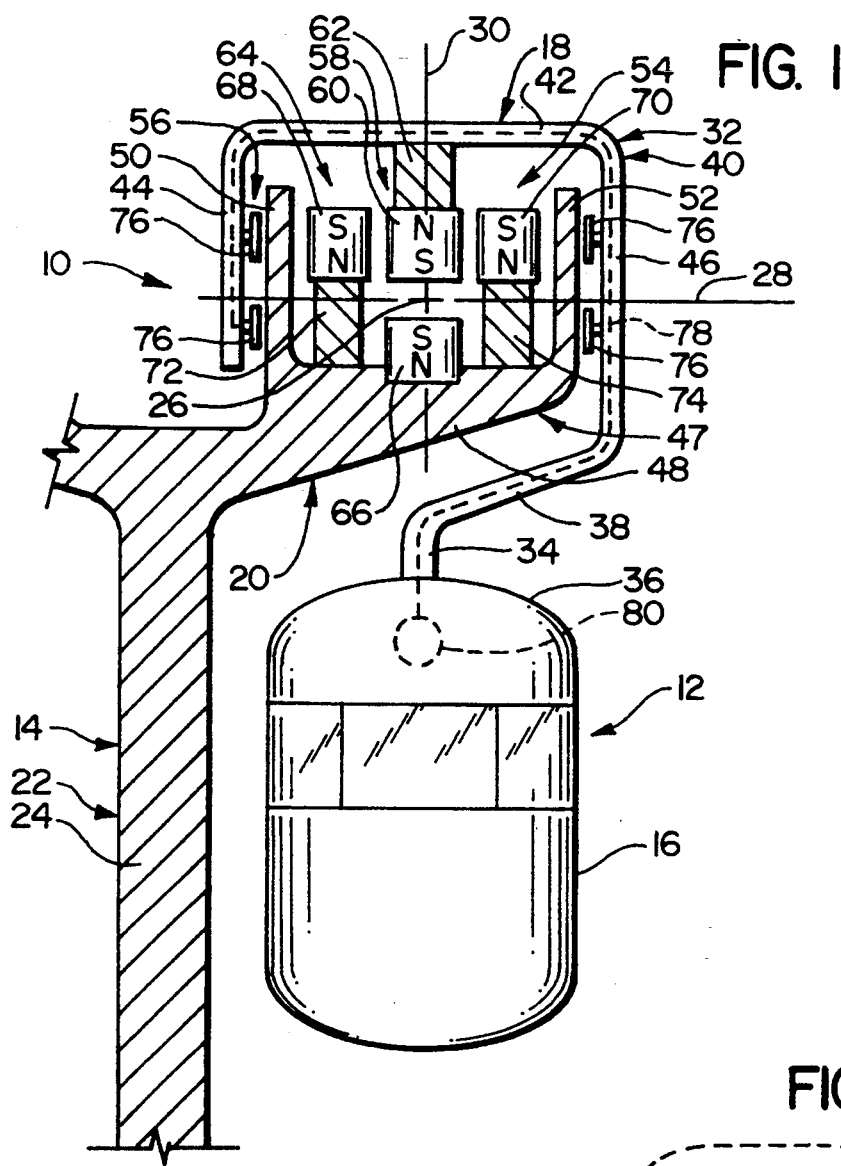
FIG. 1 is a front elevational view, partly in section, showing both the track, vehicle and vehicle support apparatus of a first embodiment of the present invention.

A first embodiment of the present invention is illustrated in FIG. 1. This embodiment, generally designated 10, comprises a vehicle 12 and a support rail 14 to which the vehicle 12 is mounted. As shown herein, this vehicle 12 comprises a body section 16 and a vehicle suspension or support section 18. The rail section 14 comprises a rail suspension or support section 20 and a base support section 22 which, as shown herein, comprises a plurality of support posts 24. For purposes of description, there is a longitudinal axis 26 which extends along the length of the rail 14 and thus defines a path of travel for the vehicle 12, a transverse axis 28, and a vertical axis 30.

In the particular arrangement shown herein, the suspension section 18 of the vehicle 10 comprises a suspension frame 32 that has a lower connecting portion 34 attached to the roof portion 36 of the body section 16. The frame 32 further comprises a laterally and upwardly extending frame section 38 that in turn connects to one leg of a U shaped frame portion 40. The U shaped frame portion 40 comprises an upper horizontal section 42, and two downwardly extending leg sections 44 and 46, with the leg section 46 being connected to the aforementioned frame portion 38. It is to be understood that the vehicle body section 16 and the support frame are, or may be of conventional construction, so these are simply shown somewhat schematically.

The rail support section 20 extends along the longitudinal axis 26 for the entire length of the rail 14, and it comprises a frame member 47 that in turn comprises a horizontal lower base portion 48, and two upstanding laterally spaced continuous leg sections 50 and 52, so as to have an inverted "U" shaped configuration in transverse section. The two leg sections 50 and 52 are positioned inside the leg portions 44 and 46 of the support frame 40 and extend as walls or plates continuously along the length of the rail The significance of the present invention resides in the manner in which the vehicle 12 is suspended from the rail support section 20. First, there is the magnetic vertical support apparatus 54, second there is the lateral or transverse support or positioning apparatus 56.

In this first embodiment, the apparatus 54 comprises a vehicle magnetic support means 58 which comprises a longitudinally extending magnet or set of magnets 60 mounted from posts or other support means 62 that in turn connect to the horizontal frame support section 42 of the vehicle support frame 32. The north and south poles of the magnet or magnets 60 are vertically aligned (with the south poles being lowermost), and the magnet or magnets 60 are centered over the center of gravity of the vehicle 12.

The apparatus 54 also comprises a rail magnetic support section 64 which is made up of three elongate magnets, or three longitudinally extending sets of magnets. There is a lower magnet or set of magnets 66 mounted immediately adjacent to the rail base 48, directly beneath the magnet or set of magnets 60 and vertically aligned therewith. The south poles of this set of magnets 66 are positioned at the top portion of the magnet(s) 66 so as to be positioned to face the south pole or poles of the magnet or set of magnets 60. Thus, it is apparent that the magnet or set of magnets 66 exerts an upward repelling or separating force relative to the magnet or set of magnets 60.

Figure 3:
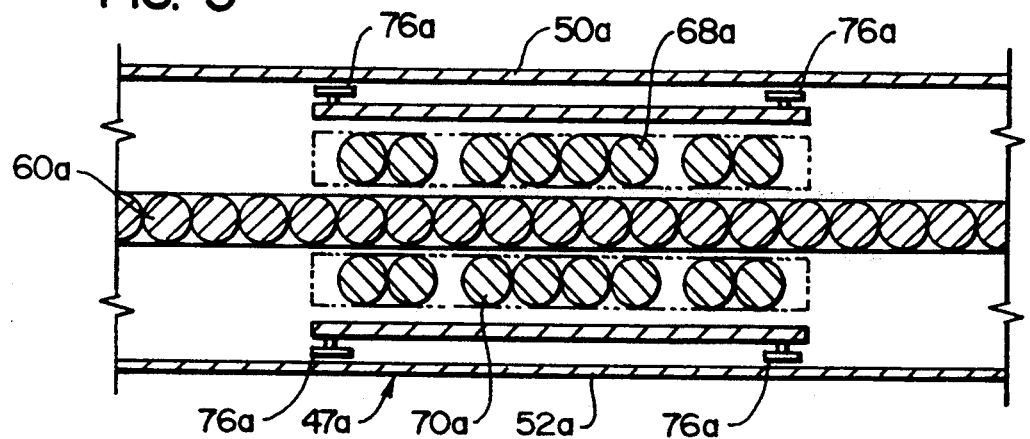
FIG. 3 is a sectional view taken along line 3—3 of FIG. 2.

The rail magnetic support system 60 in addition comprises left and right magnets or sets of magnets 68 and 70, respectively, positioned on opposite sides of the magnet or set of magnets 60. In further describing this first embodiment, the magnets 60, 66, 68 and 70 shall each simply be considered single elongate magnets, extending along the longitudinal axis, even though these could be made as a plurality of individual magnets positioned adjacent to one another in a longitudinal row (as shown in FIG. 3).

It will be noted that the left and right rail magnets 68 and 70 have their south poles positioned in an upper vertical position and the north poles at a lower position. These magnets 68 and 70 are supported from support posts or other support means, shown at 72 and 74, respectively.

Before discussing the magnetic support system 54 in any more detail, there will be a description of the lateral positioning system 56. Positioned at the two inside surfaces of the two support legs 44 and 46 are sets of what can be termed "air castors" 76, each of which is connected through a pressurized air line 78 (indicated schematically) that is located in the frame 18, and connected to a source of pressurized air 80 in the vehicle body 16.

Figure 1A:
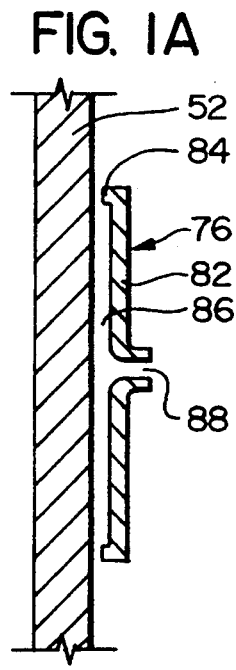
FIG. 1A is an enlarged sectional view of one of the air castors used to laterally position the vehicle.

FIG. 1A is an enlarged cross sectional view of one of the air castors 76, and it can be seen to comprise a circular main plate 82 and a peripheral skirt 84, with the plate 82 and skirt 84 defining a plenum chamber 86 that is pressurized through the air passageway 88. As the pressurized air flows into the plenum 86 and out between the skirt 84 and the wall 50 or 52, the pressure in the chamber 86 causes the castor 76 to be spaced a short distance away from the surface of the wall 50 or 52. When the castor 76 is closer to the wall, the air flow is turbulent with high static pressure. But if the caster 76 is moved a small fraction of an inch further away, the air flow escape velocity increases and goes to laminar flow with low static pressure. This causes the castor 76 to be pushed more closely to an adjacent wall 50 by the higher pressure of the opposite castor 76 against the other wall 52. Thus the air castor 76 remains spaced from the wall 50 or 52 at a relatively precise distance and yet provides very low friction bearing since there is no contact between the castors and the walls 52.

Desirably there are on each side upper and lower sets of casters 76, and the casters are also longitudinally spaced, thus providing roll and yaw stability. There should be a minimum of three casters 76 on each side.

To obtain the stable, highly damped positioning of the caster 76 in relation to the lateral wall, the ratio of the caster diameter to skirt length should be 100 to 1 or greater, and the plenum chamber needs to be smooth, flat and parallel to the adjacent wall.

Let us now turn our attention to the overall operation of the first embodiment shown in FIG. 1. Let it be assumed that this system is to be incorporated in a high speed transit system. The rail support section 20 extends substantially continuously along the entire length of the rail, and the magnets 66, 68 and 70 also extend substantially continuously along the entire length of the rail. Also, the two side walls 50 and 52 are arranged to provide substantially continuous wall surfaces along the entire length of the rail 14 so as to provide a proper locating surface with which the air castors 76 can react to properly position the frame 18 for the vehicle 12. The magnets 60, 66, 68 and 70 are desirably permanent magnets which are chosen or designed for their resistance to demagnetizing effects. Sintered ferrite magnets, commonly known as "ceramic" magnets are outstanding in their ability to withstand demagnetizing fields, as are magnets using rare earth elements.

With permanent magnets being used, the vehicle 12 will remain suspended on the rail 14, without any relative movement between the two. To move the vehicle 12 along the rail 14, various propulsion means could be used, such as aircraft engines, or by using low friction drive wheels that could be in contact with portions of the rail 14.

Let us now examine the manner in which the magnetic forces act in this first embodiment of FIG. 1. As indicated previously, the two magnets 60 and 66, being vertically aligned with one another and with like poles being positioned oppositely to one another, repel each other and thus provide a lifting force against the magnet 60 which in turn applies this lifting force to the vehicle frame 18 and body 16.

With regard to the two magnets 68 and 70, these are (as shown in FIG. 1) at substantially the same level as the center vehicle magnet 60, and the polarity of these two magnets 68 and 70 are reversed relative to the center magnet 60. Thus, there is an attractive force between the center magnet 60 and each of the magnets 68 and 70 spaced laterally therefrom. These laterally directed force components tend to offset each other (provided the magnet 60 stays substantially centered).

If the magnet 68 and 70 are at the same level as the center magnet 60, there is no net vertical force one way or the other. However, let us assume for the moment that the vehicle body 16 is either unloaded, or has only a small load therein, so that the repelling force between the lower magnet 66 and the vehicle magnet 60 is enough to maintain the vehicle body 60 where the magnet 60 is at the same level as the magnets 68 and 70. At this time, there is no net vertical force provided by the magnets 68 and 70 relative to the magnet 60. Let us further assume, however, that the vehicle body 16 becomes filled with passengers (or cargo) to increase its weight so that the vehicle 16 starts to drop, and the magnet 60 comes closer to the magnet 66. Of course, as the magnets 60 and 66 come closer to each other, the repelling force becomes greater so as to tend to overcome this force.

In addition, however, it should be noted that as the upper north pole of the magnet 60 moves lower relative to the south poles of the magnets 68 and 70, there is a lifting force provided between the single middle north pole and the two upwardly positioned south poles of the magnet 68 and 70. Also, the lower middle south pole of the magnet 60 interacts with the two adjacent downwardly positioned north poles of the magnet 68 and 70 to provide a lifting force. Further, the north pole of the magnet 60 is repelled by the two north poles of the side magnets 68 and 70. These effects are commonly described in basic texts on magnets and magnetism by discussing the magnetic lines of flux between opposing poles. When the magnets 68 and 70 are positioned in side by side alignment with the center magnet 60, as shown in FIG. 1, the magnetic fields are said to be in balance, and there is no net up or down force. However, when the magnet 60 moves downwardly, this is said to distort the field of flux, and the resulting net forces tend to restore the flux fields to their undistorted balanced configuration, thus producing the lifting force.

Now let us examine what would happen if the center magnet 60 moves upwardly from the position in FIG. 1. If this occurs, the flux field between the magnets 68 and 70 and the center magnet 60 would tend to be distorted in the opposite direction, and the restoring force to move the magnet 60 to a location where the magnetic fields of flux would be undistorted would be a net downward force. This upward movement of the magnet 60 could be generated, for example, by vertical oscillation or movement resulting from high speed travel.

Each of the magnets 68 and 70 can each be considered to be in linking relationship with the magnet 60, in the sense that these each create a strong attracting magnetic loop with the magnet 60 that resists movement that would stretch the magnetic field. On the other hand, the magnets 60 and 66 are in opposing relationship where the magnetic fields repel one another with a force that varies inversely as the square of the distance between the magnets 60 and 66.

It has been found that the overall effect of these interacting magnetic fields of the arrangement shown in FIG. 1 is such that two things are accomplished. First, a "bounciness" or up and down resiliency or springiness is substantially diminished. If one could equate the interaction of the magnets 60, 66, 68 and 70 to a spring, this spring would become relatively stiff. Another result (as indicated above) is that if the magnet 60 is raised above the level of the adjacent magnets 68 and 70, there is a strong downward force that tends to restore the magnet 60 back to its intermediate position. This is a very desirable safety feature, in that if there is some outside force exerted on the vehicle 12 that would tend to raise it away from the track 14, the magnetic forces would strongly resist this.

It is to be understood, of course, that the arrangement of the magnets could be reversed by mounting the magnets 66, 68 and 70 to the vehicle frame 40, and the single magnet 60 to the rail 14. This arrangement is shown in FIGS. 14 and 15 to be described later herein.

Figure 2:
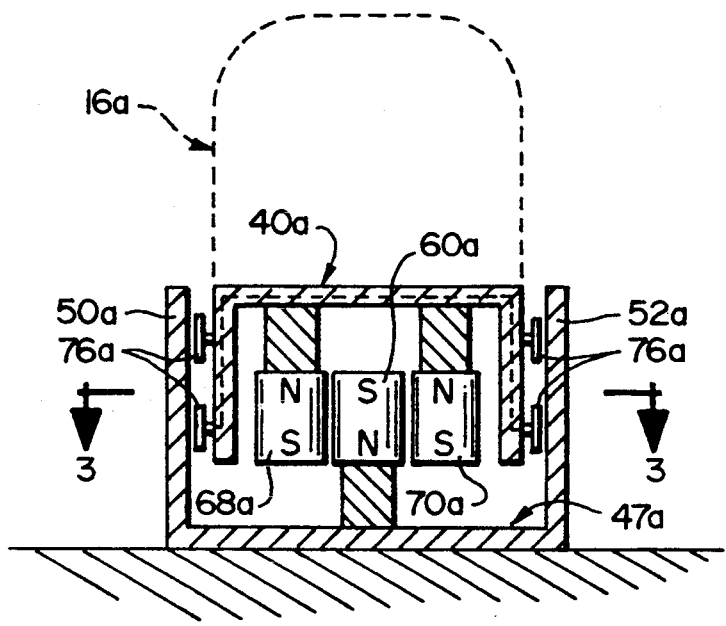
FIG. 2 shows a second embodiment of the present invention, with only the magnetic support system of the vehicle and a portion of the track being shown, for ease of illustration.

The second embodiment of the present invention is shown in FIG. 2. Components of this second embodiment which are similar to components of the first embodiment will be given like numerical designations, with an"a" suffix distinguishing those of the second embodiment. For ease of illustration, the vehicle and support frame, such as shown at 16 and 32 in FIG. 1, are not shown; nor is the rail base support, such as shown at 22 in the first embodiment illustrated in FIG. 1.

There is a vehicle support frame 40a having side air castors 76a, with the castors 76a interacting with the walls 50a and 52a of the continuous rail support structure 47. Also, the side magnet 68a and 70a are both mounted to the horizontal portion of the vehicle support frame 40a.

It will be seen that there is no center magnet corresponding to the magnet 66 of the first embodiment of FIG. 1. Thus, the entire vertical positioning force results from the interaction of the magnets 60a, 68a, and 70a. In actual operation, it would be assumed that the weight of the vehicle would move the magnets 68a and 70a below the neutral position shown in FIG. 2.

The preferred design is presently believed to incorporate opposing magnets in addition to the linking magnets. However, this second embodiment is shown to demonstrate that sets of linking magnets alone can be used to provide an operable system.

Figure 4:
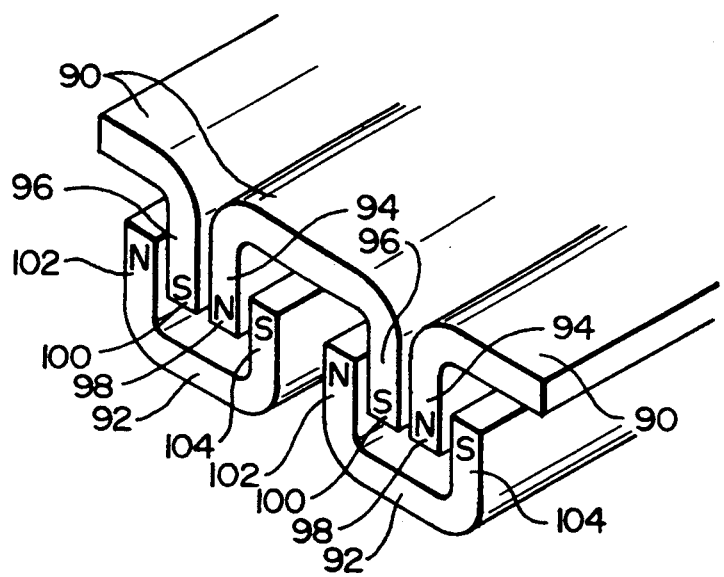
FIG. 4 is an isometric view showing only the magnetic support system of yet a third embodiment of the present invention.

The third embodiment of the present invention is illustrated in FIG. 4. In this third embodiment, there is also shown only the linking magnetic components of the magnet suspension system. It is to be understood, of course, that additional opposing magnetic components could be added to provide upward force components to the vehicle, and also that lateral positioning members, such as the castors 76 of the first embodiment, would be used.

In this third embodiment of FIG. 4, there is a set of upper magnets 90, and a set of lower magnets 92. The upper magnets 90 are elongate "U" shaped magnets having the two legs 94 and 96 extending downwardly, so as to provide laterally spaced north and south poles 98, and 100 respectively. Each lower magnet 92 has a similar "U" shaped configuration, having two legs 102 and 104, with laterally spaced north and south poles.

From the foregoing description of the first and second embodiments, it is readily apparent that as the upper magnets 90 move downwardly so that the magnetic poles of the legs 94 and 96 are displaced away from the adjacent legs 102 and 104 of the lower magnets 92 so as to distort the adjacent magnetic fields, there will be an upward restoring force which would tend to lift the vehicle to which the magnets 90 are attached. On the other hand, if the magnets 90 are raised so as to move the poles of the legs 94 and 96 out of lateral alignment with the poles of the legs 102 and 104, the magnetic fields between these components will be distorted upwardly, thus tending to pull the magnets 90 downwardly toward the magnets 92.

As indicated above, in addition to providing magnets 90 and 92, an additional opposing set or sets of magnets could be utilized to create additional lift. Also, lateral positioning air castors 76 could be used.

Figure 5:
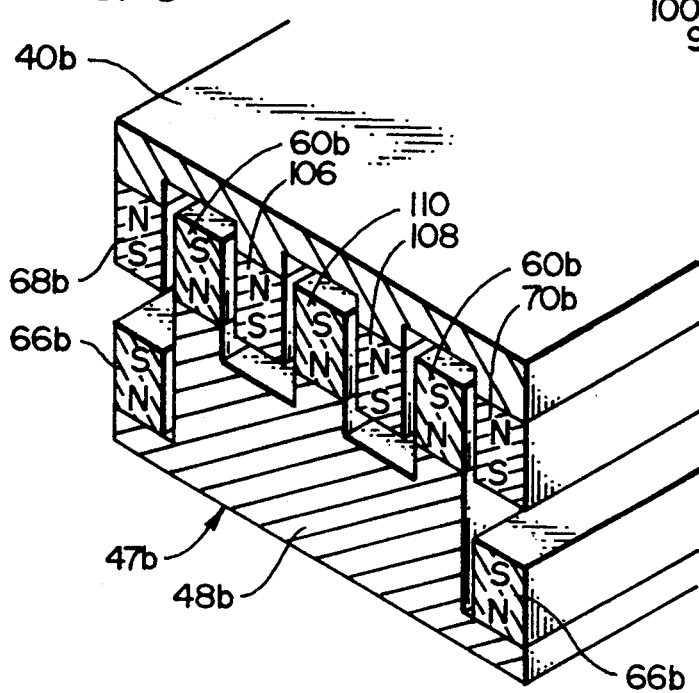
FIG. 5 is an isometric view of yet a fourth embodiment of the present invention, showing only the magnetic supporting portion of the system.

A fourth embodiment of the present invention is shown in FIG. 5. Components of this fourth embodiment which are similar to components of the prior embodiments will be given like numerical designations, with a "b" suffix distinguishing those of the fourth embodiment. In FIG. 5 there is not shown the vehicle, the vehicle suspension frame, the rail base frame, nor the continuous rail support structure, nor the side castors and walls. It is to be understood that these components could be provided generally in the same manner as described in the first embodiment of FIG. 1. For ease of illustration, only the interacting magnetic components are shown.

It can be seen in examining the fourth embodiment of FIG. 5, the same principles of operation are utilized, as in the first embodiment, but with the various magnets being spaced somewhat differently. As in the first embodiment, there are two laterally spaced linking magnets 68b and 70b, and these are positioned adjacent to and on opposite sides of a pair of linking magnets 60b, positioned adjacent to magnets 68b and 70b, but provided as two magnets spaced laterally therefrom. In addition, there are two additional linking magnets 106 and 108 mounted to the frame member 40b. Also, there is an additional center positioned magnet 110 mounted to the rail frame 47b. On opposite sides of the continuous rail base member 47b, there are two laterally spaced opposing magnets 66b that are positioned immediately below the magnets 68b and 70b.

In operation, when the magnets 68b, 106, 108, and 70b are in horizontal alignment with the magnets 60b and 110, there is no net force, either upwardly or downwardly, exerted between these two sets of magnets. However, as the upper frame portion 40b is moved upwardly or downwardly, there will be exerted a downward or upward force, respectively. As in the first embodiment, the two magnets 66b exert simply a repelling force against the two vertically adjacent magnets 68b and 70b. It will be noted that the lateral spacing of these two magnets 66b, in addition to preventing bottoming out in the event of excess downward vertical loading, would help to increase roll stability for the system.

Four further embodiments are shown in FIGS. 6, 7, 8 and 9, respectively. These were constructed as test models to demonstrate the relative merits of four different arrangements of magnets.

Figure 6:
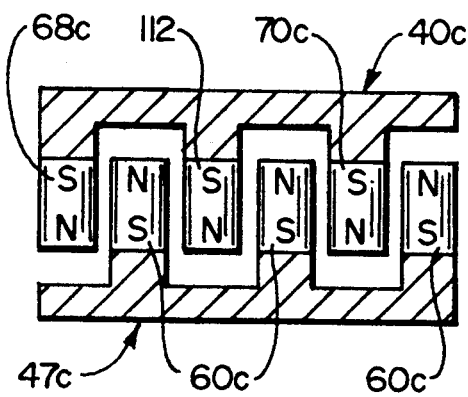
FIGS. 6, 7, 8, and 9 are transverse sectional views of fifth, sixth, seventh, and eighth embodiments, respectively, of the present invention, showing only the magnetic supporting section, these being constructed as prototype models to demonstrate the relative merits of these three embodiments.

The fifth embodiment is shown in FIG. 6, and as in the description of the third and fourth embodiments of FIGS. 4 and 5 respectively, FIG. 6 only shows the magnetic mounting system somewhat schematically. Components of this fifth embodiment which are similar to components of the prior embodiments will be given like numerical designations, with a "c" suffix distinguishing those of the fifth embodiment.

It can readily be seen that the fifth embodiment is rather similar in overall configuration to the second embodiment of FIG. 2, except that three additional magnets are added. Thus, there is an upper frame member 40c having two outer magnets 68c and 70c, and a center magnet 112. The lower frame member 47c has three upwardly extending magnets, all of which are designated 60c and in terms of function correspond generally to the single magnet 60a of FIG. 2.

It can be seen that all of the magnets in FIG. 6 are in linking relationship, with upper and lower magnets spaced from one another laterally in an alternating pattern, so that there is a neutral position where there is no vertical force exerted, either upwardly or downwardly. But as the upper frame member 40c moves downwardly to displace the magnets 68c, 70c, and 112c downwardly, a net vertical upward force will be exerted. Opposite motion will create a vertical downward force to prevent the vehicle from lifting off the rail. In addition, the spacing of several magnets as shown in FIG. 6 would tend to add roll stability. Overall, in comparison with the arrangement of the fourth embodiment of FIG. 5, there would be relatively greater resistance to "lift off" in comparison with the load capacity provided by the magnetic suspension system, and there would be greater maximum resistance to bounce oscillation with the arrangement of FIG. 6. However, the maximum upward force, relative to the number of magnets used, may be less.

Figure 7:
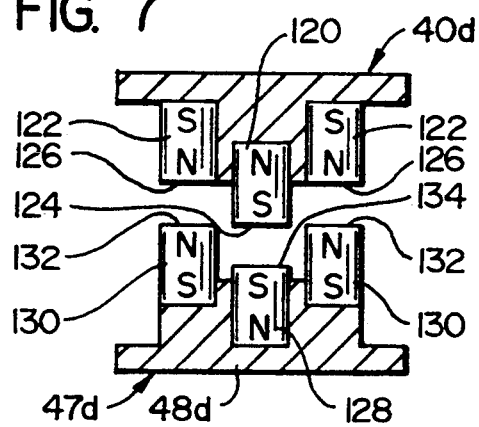

A sixth embodiment of the present invention is illustrated in FIG. 7. Components of this sixth embodiment which are similar to components of the prior two embodiments will be given like numerical designation, with a "d" suffix, distinguishing those of the second embodiment.

There are upper and lower frame members 40d (operably connected to the vehicle which is not shown), and 47d which is supported from the continuous rail structure. Mounted to the upper frame member 40d is a center magnet 120 and two side magnets 122. The center magnet 120 is positioned lower than the side magnets 122 and has its south pole at 124 positioned downwardly. On the other hand, in the magnets 122, the north pole 126 is positioned downwardly.

There is a center magnet 128 and two side magnets 130 connected to the lower rail frame 48d. The two side magnets 130 each has its north pole 132 directed upwardly, so as to be in opposition with the north poles 126 of the upper side magnets 122. The middle lower magnet 128 has its south pole 134 positioned upwardly so as to be in opposition to the south pole 124 of the upper center magnet 120.

In operation, it can readily be seen that all three sets of magnets that are now positioned have adjacent like poles which repel each other. However, it should also be noted that with the middle upper magnet 120 being positioned downwardly relative to its two side magnets 122, the south pole of the magnet 124 comes into lateral alignment with the north poles 132 of the two lower side magnets 130. In this respect, the lower south pole of the middle magnet 120 has a linking relationship with the two north poles 132. Thus, movement of the upper frame 70d above the neutral position tends to cause the interaction between the south pole 124 and the north poles 132 to pull the frame 40d downwardly, thus counteracting the upward force. On the other hand, when the frame 40d moves further downwardly so that the south pole 124 moves below the level of the two north poles 132, then the interaction of the south pole 124 with these two north poles 132 tends to add a lifting force component to move the frame 40d upwardly. Thus, it can be seen that the middle pole 124 of the middle upper magnet 120 is both in linking relationship (relative to the side north poles 132), and is in opposing relationship (relative to the middle lower south pole 134. There are a number of other magnetic relationships involved.

Figure 8:
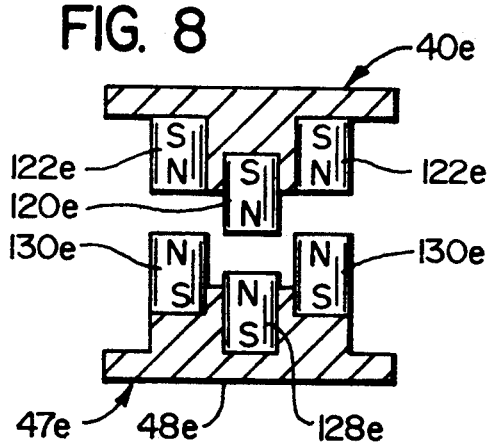

To illustrate certain features of the present invention, reference is now made to FIG. 8, which shows a seventh embodiment with a configuration of magnets quite similar to FIG. 7, but in a less preferred arrangement. The components of FIG. 8 which are similar to FIG. 7 will be given like numerical designations, with an "e" suffix distinguishing those of the test model of FIG. 8. It can be seen that the arrangement of FIG. 8 is substantially the same as in FIG. 7, except that the polarities of the middle magnets 120e and 128e are both reversed so that all of the magnets in vertical alignment have opposing north poles adjacent to one another.

Figure 10:
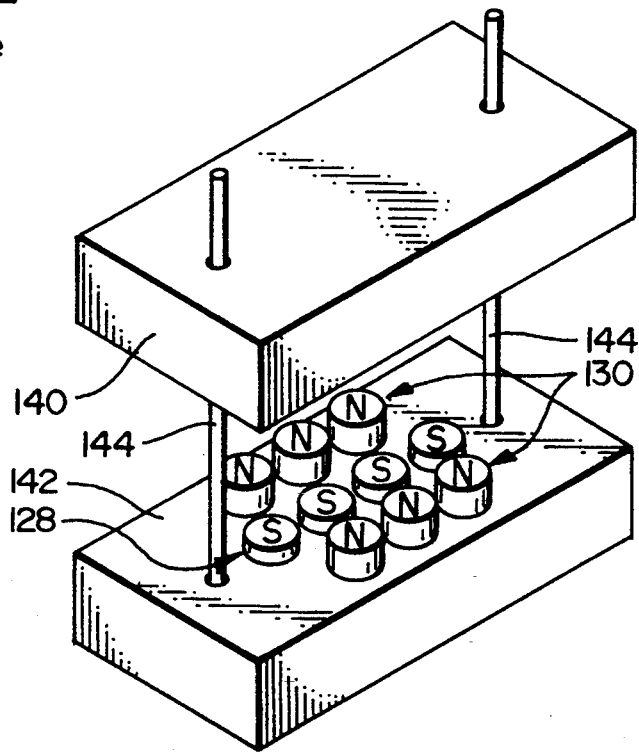
FIG. 10 is an isometric view illustrating a test setup to measure the effectiveness of certain arrangements of the embodiments of the present invention.

To provide a comparison between the embodiment of FIG. 7 and that of FIG. 8, a model was constructed as shown in FIG. 10, where there are upper and lower blocks 140 and 142, mounted one above the other by two metal rods 144. The lower ends of the rods 144 were fixedly connected in the lower block 142, and the upper block 140 was slide mounted to these rods 144. Ten magnets were mounted in the lower block 142, there being two outside rows of three magnets apiece, these magnets being designated 130 and a center row of magnets 128. A similar arrangement of magnets was mounted in the upper block, with the center row of four magnets having their south poles directed downwardly, and the outer two row of magnets having their north poles directed downwardly. This is the same arrangement as shown in FIG. 7. Then a downward force was exerted on the upper block 140 until the magnets in the upper block 140 bottomed out (i.e. came in contact with) the lower set of magnets in the bottom block 142.

Then this very same process was repeated, except that the magnets 128 in the lower block had their mountings reversed so that the north poles of the center row of magnets 128 all had the north poles facing upwardly. In other words, all of the magnets 128 and 130 in the lower block 142 had their north poles facing upwardly. In like manner, all of the magnets in the upper block 140 were arranged so that their north magnetic poles were facing downwardly. This is the very same arrangement as shown in FIG. 8. Then the block 40 was again pushed down so that the upper magnets bottomed out (i.e. came into contact) with the lower magnets.

Figure 11:
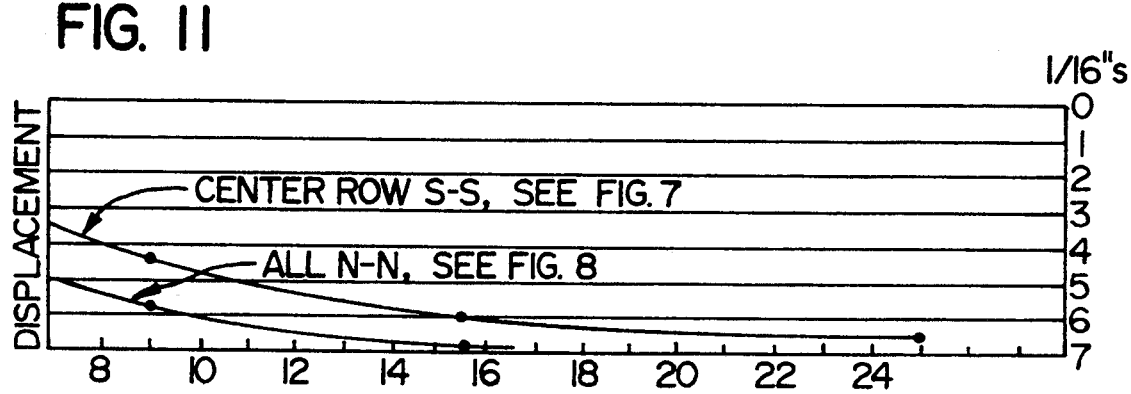
FIG. 11 is a graph illustrating the results obtained in the experiment conducted in connection with the arrangement of FIG. 10.

The magnets used were ceramic magnets having a lengthwise dimension of 11/16 inch, and a diameter of ⅜ inch. The test results are shown in FIG. 11, and these indicate that in the arrangement of FIG. 8, where all of the magnetic poles were facing one another were of the same polarity (all north poles) at fifteen and one half pounds vertical loading, the magnets in the upper block had bottomed out. On the other hand, with the arrangement of FIG. 7, at twenty five pounds vertical loading, the magnets in the upper block had not quite bottomed out.

Figure 9:
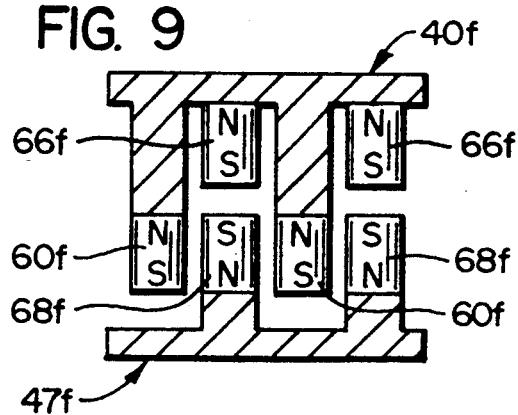

Reference is now made to FIG. 9, which shows an eighth embodiment of the present invention. Components of this eighth embodiment which are similar to the components of the prior embodiments will be given like numerical designations with an "f" suffix distinguishing those of this eighth embodiment. As in the prior embodiment shown in FIGS. 6, 7 and 8, there are a total of six magnets or sets of magnets. These are arranged to incorporate in general the functional relationships of the fourth embodiment of FIG. 5, where some of the magnets or sets of magnets are only in opposing relationship or are only in linking relationship; others of the magnets or sets of magnets are in both opposing and linking relationship.

Thus, it can be seen that there are two upper magnets 66f which are mounted to the upper frame 40f and are only in opposing relationship. Then there are the two magnets 68f mounted to the lower frame 47f, with these being aligned directly below the magnets 66f and being in opposing relationship relative to these magnets 66f. Then there are two additional magnets or set of magnets 60f mounted to the upper frame 40f, spaced laterally of the magnets 68f. These magnets 60f are solely in linking relationship with the magnets 68f.

It is evident, of course, that other magnetic relationships would come into place as there is relative vertical movement between the frames 40f and 47f. For example, as the frame 40f is raised, then it is evident that the north poles of the magnets 60f would be moving away from the south poles of the magnets 68f, and that an attractive force would occur between those two poles. At the same time, the south poles of the two magnets 60f would be moving closer to the south poles of the magnets 68f, thus producing an opposing force.

As indicated previously, the experiments conducted with regard to the embodiments of FIGS. 7 and 8 indicated that the embodiment of FIG. 7 showed substantially greater resistance to maximum vertical displacement, in comparison with that of FIG. 8. Nevertheless, the arrangement in FIG. 7 was still somewhat "bouncy", or "springy" in that oscillating up and down movement was not resisted to a great extent.

However, the arrangement of FIG. 6 provided substantial improvement in that it had very little bounce, and there was substantial resistance to "lift off".

Figure 12:
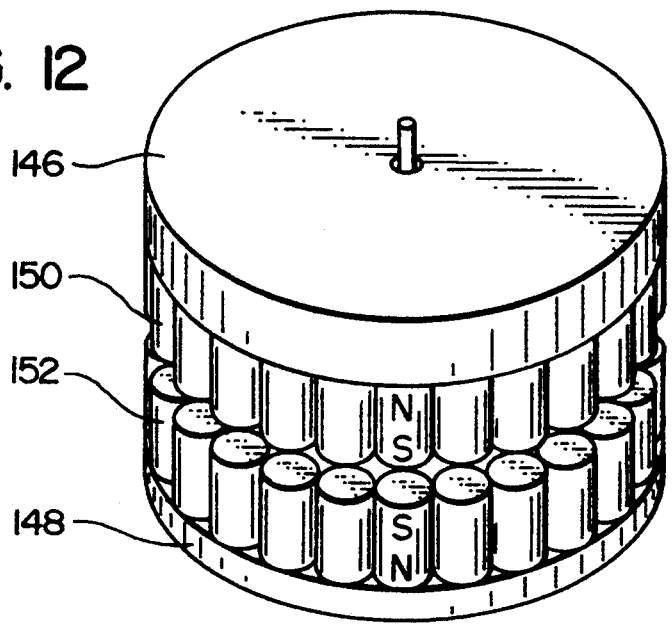
FIG. 12 is an isometric view showing the test setup of FIG. 11.
Figure 13:
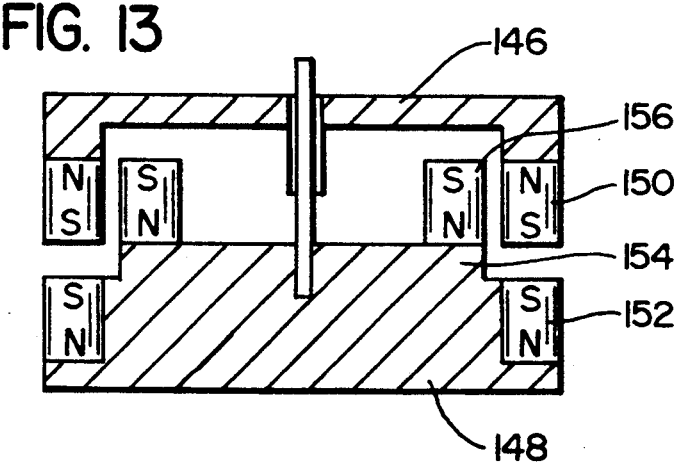
FIG. 13 is a sectional view showing a second test setup to illustrate certain features of the present invention.

At a later time, another experiment was carried out, and this was done by providing upper and lower blocks 146 and 148, provided as circular disks, as shown in FIGS. 12 and 13.

Then an upper circular array of magnets 150 were placed around the periphery of the upper block 146, with the south poles being directed downwardly. Then a similar array of lower magnets 152 were positioned around the perimeter of the lower block 148, with their south poles directly upwardly, so as to be in opposition to the upper circular array of magnets 150. The lower block 148 was provided with a raised center portion 154, and another circular array of magnets 156 was provided so as to be positioned within the magnets 150. It is readily apparent that this arrangement is quite similar to that shown in FIG. 5, except that the three center magnets 106, 108 and 110 are omitted, and except that the magnets are arranged in a circular pattern and not longitudinally aligned. Also, this arrangement is similar to, in terms of functional relationships, the arrangement of FIG. 9.

Then a downward force was exerted on the top block 146 until the magnets bottomed out. It was found that the resisting force of the arrangement shown in FIGS. 12 and 13, in proportion to the number of magnets used, was substantially greater than the resisting force of the arrangement of FIG. 7, relative to the number of magnets used. Further, when it was attempted to raise the upper block 146 away from the lower block 148, there was a very strong restoring force that pulled the upper block 146 downwardly. Thus, this demonstrated that in the arrangement of FIGS. 12 and 13 (which is quite similar to the arrangement of FIG. 5 and 9), the magnets (in terms of net force per magnet) were used even more effectively.

While quantitative comparative experimental results were not obtained with regard to the embodiments of FIGS. 5, 6, 9, 12 and 13, test results and analysis indicate that the arrangement of FIG. 6 would likely have greater resistance to "lift off" (to the force moving the frame 40c upwardly away from the lower frame 47c), and the arrangement of FIG. 9 would have greater total resistance to a downward force toward the apparatus to "bottom out". Further tests showed that the arrangement of FIG. 6 would be less susceptible to being "springy" or "bouncy" relative to arrangement of FIG. 9. Nevertheless, it should also be noted that the experiments carried out with the prototype shown in FIGS. 9, 12 and 13 showed that arrangement to be quite stiff and highly resistant to "lift off".

To present a further analysis and explanation of the interaction of the forces of the magnets in linking and opposing relationship, reference is now made to FIGS. 14 and 15 which shows a ninth embodiment that has an arrangement of magnets quite similar to that shown in FIGS. 1, except that the magnets are reversed. Similar numerical designations will be used with regard to the arrangement shown in 14 and 15, with a "g" suffix distinguishing those of the ninth embodiment of the present invention.

Thus, it can be seen that there is a single magnet or set of magnets 66g mounted to an upper frame 40g. Then there is mounted to the lower frame 47g a center positioned magnet 60g. Also, there are two laterally spaced magnets 68g and 70g which in the neutral position are at the same height as the center magnet 60g. These magnets 68g and 70g are mounted to the upper frame 40g.

In FIG. 14, the ninth embodiment is shown where a substantial downward vertical force is exerted on the upper frame 40g, so as to move the upper frame 40g below the neutral position. It can be seen, that the two magnets 66g and 60g have in this position a stronger repelling force, since these are moved closer together. Also, it can be seen that there are six interacting force components between the center magnets 60g and the two lateral magnets 68g and 70g.

More precisely, the upper south pole of the center magnet 60g interacts with the north poles of the magnets 68g and 70g to tend to pull the two magnets 68g and 70g upwardly. Then the lower north pole of the center magnet 60g interacts with the north poles of the laterally spaced magnets 68g and 70g to create repelling force components that also tend to move the magnets 68g and 70g upwardly. Finally, the lower positioned north pole of the center magnet 60g interacts with the two lower positioned south poles of the magnets to create attractive forces which have a net upward force component. Thus, it can be seen that all of these force components are acting to lift the upper frame 40g, with the three magnets 60g, 68g and 70g upwardly.

Attention is now turned to FIG. 15, which shows the frame 40g with its magnets 66g, 68g and 70g being moved upwardly above the neutral position. It can now be seen that the various forces between the center magnet 60g and the side magnet 68 and 70g all have net downward force components, these acting to prevent "lift off". Further, it can be seen that with the magnet 66g being moved further away from the magnet 60g, the repelling force between these magnets is substantially reduced.

It is to be understood that various modifications could be made in the present invention without departing from the basic teachings thereof, and also be within the scope of the claims as presented below.

What is claimed:

1. A vehicle/track transportation system, comprising:
   a. a track having a longitudinal axis aligned with a path of travel along said track, a vertical axis and a horizontal axis;
   b. a vehicle having a longitudinal axis, a vertical axis and a lateral axis, and arranged to be magnetically supported from said track for movement along said track path of travel;
   c. first and second magnetic support means, one of said first and second magnetic support means being a track magnetic support means mounted to said track and the other of said first and second support means being a vehicle magnetic support means mounted to said vehicle;
   d. said vehicle having an operating position adjacent to said track where said vehicle is properly positioned so as to be adequately supported from said track by the two magnetic support means, and positioned for movement along said track;
   e. said first magnetic support means comprising at least one first magnetic component having north and south poles;
   f. said second magnetic support means comprising:
      i. at least one second opposing magnetic component which has north and south poles and is positioned in opposing magnetic relationship to said first magnetic component in a manner that poles of said second opposing magnetic component and said first magnetic component of like polarity are vertically spaced from each other, and facing each other, to create a magmatic repelling force therebetween;
      ii. at least one second linking magnetic component which has north and south poles, and which, with the vehicle in the operating position, is positioned with at least one of the north and south poles of said second linking magnetic component being positioned laterally of, and adjacent to, at least one magnetically opposite one of the north and south poles of the first magnetic component, so that the adjacent and magnetically opposite pole of the first magnetic component form linking lines of flux with the adjacent opposite pole of the second linking magnetic component within a vertical support region, so that with the vehicle at a lower part of said region, magnetic lines of force between said adjacent poles exert an upward force on said vehicle, and, with the vehicle at an upper part of said region, the magnetic lines of force between said adjacent poles exert one of a downward force on said vehicle and a lesser upward force on said vehicle;

wherein the north and south poles of said first magnetic component are vertically aligned with one on top the other, and the north and south poles of the second linking magnetic component are vertically aligned with one on top the other.

2. The system as recited in claim 1, wherein both of the north and south poles of the second linking magnetic component are positioned laterally adjacent to both of the south and north poles, respectively, of the first magnetic component to form linking lines of flux therebetween.

3. The system as recited in claim 1, wherein said vehicle is provided air castor means comprising an air plenum means having a plenum to receive pressurized air, and a peripheral skirt surrounding said plenum, said track having a longitudinally extending wall means providing a lateral support rail surface having a vertical alignment component, said system being arranged with said vehicle in the operating position relative to said track, said skirt is positioned adjacent to said lateral support surface, with the pressurized air in said plenum flowing outwardly between said skirt and said lateral support surface so as to position said vehicle relative to said track.

4. The system as recited in claim 3, wherein there are two of said air castor means positioned oppositely from one another, and also two wall means to interact with respective ones of said two air castor means to provide lateral support and position of said vehicle.

5. The system as recited in claim 2, wherein there is a second linking magnetic components positioned in linking magnetic relationships with said first magnetic support means.

6. The system as recited in claim 5, wherein there are at least two second opposing magnetic components in opposing relationship to said first magnetic support means.

7. The system as recited in claim 1, wherein there are at least two first magnetic field components, at least two second opposing magnetic field components in opposing relationship to the first magnetic components, and at least two second linking magnetic field components in magnetic linking relationship with said first magnetic components.

8. The system as recited in claim 7, wherein both the north and the south poles of the two first magnetic components making relationship with respective south and north poles of the two second linking magnetic components.

9. The system as recited in claim 8, wherein the north and south poles of each of the first magnetic components are vertically aligned, and the north and south poles of each of the second linking magnetic field components are vertically aligned.

10. The system as recited in claim 9, wherein there is a plurality of additional first field components positioned in laterally spaced magnetic linkage relationship with a plurality of second linking magnetic components.

11. The system as recited in claim 1, wherein there is a second linking magnetic component positioned in linking magnetic relationships with said first magnetic support means.

12. The system as recited in claim 11, wherein there are at least two second opposing magnetic components in opposing relationship to said first magnetic support means.

13. The system as recited in claim 12, wherein there are least two first magnetic field components, at least two second opposing magnetic field components in opposing relationship to the first magnetic components, and at least two second linking magnetic field components in magnetic linking relationship with said first magnetic components, all of said components having north and south poles that are vertically aligned with each other.

14. The system as recited in claim 13, wherein both the north and the south poles of the two first magnetic components are in linking magnetic relationship with respective south and north poles of the two second linking magnetic components.

15. The system as recited in claim 14, wherein there is a plurality of additional first field components positioned in laterally spaced magnetic linkage relationship with a plurality of second linking magnetic components.

16. A vehicle/track transportation system, comprising:
   a. a track having a longitudinal axis aligned with a path of travel along said track, a vertical axis and a horizontal axis;
   b. a vehicle having a longitudinal axis, a vertical axis and a lateral axis, and arranged to be magnetically supported from said track for movement along said track path of travel;
   c. first and second magnetic support means, one of said first and second magnetic support means being a track magnetic support means mounted to said track and the other of said first and second support means being a vehicle magnetic support means mounted to said vehicle;
   d. said vehicle having an operating position adjacent to said track where said vehicle is properly positioned so as to be adequately supported from said track by the two magnetic support means, and positioned for movement along said track;
   e. said first magnetic support means comprising at least one first magnetic component having north and south poles;
   f. said second magnetic support means comprising:
      i. at least one second opposing magnetic component which has north and south poles and is positioned in opposing magnetic relationship to said first magnetic component in a manner that poles of said second opposing magnetic component and said first magnetic component of like polarity are vertically spaced from each other, and facing each other, to create a magmatic repelling force therebetween;
      ii. at least one second linking magnetic component which has north and south poles, and which, with the vehicle in the operating position, are positioned with the north and south poles of said second linking magnetic component being positioned laterally of, and adjacent to, magnetically opposite north and south poles of the first magnetic component, respectively, so that the adjacent and magnetically opposite pole of the first magnetic component form linking lines of flux with the adjacent opposite poles of the second linking magnetic component within a vertical support region, so that with the vehicle at a lower part of said region, magnetic lines of force between said adjacent poles exert an upward force on said vehicle, and, with the vehicle at an upper part of said region, the magnetic lines of force between said adjacent poles exert one of a downward force on said vehicle and a lesser upward force on said vehicle;

wherein the north and south poles of said first magnetic component are vertically aligned with one on top the other, and the north and south poles of the second linking magnetic component are vertically aligned with one on top the other.

17. The system as recited in claim 16, wherein there is a second linking magnetic components positioned in linking magnetic relationships with said first magnetic component.

18. The system as recited in claim 17, wherein there are at least two second opposing magnetic components in opposing relationship to said first magnetic support means.

19. A method of supporting a vehicle from a track, comprising:
   a. providing a track having a longitudinal axis aligned with a path of travel along said track, a vertical axis and a horizontal axis;
   b. providing a vehicle having a longitudinal axis, a vertical axis and a lateral axis, and arranged to be magnetically supported from said track for movement along said track path of travel;
   c. providing first and second magnetic support means, one of said first and second magnetic support means being a track magnetic support means mounted to said track and the other of said first and second support means being a vehicle magnetic support means mounted to said vehicle;
   d. positioning said vehicle in an operating position adjacent to said track where said vehicle is properly positioned so as to be adequately supported from said track by the two magnetic support means, and positioned for movement along said track;
   e. providing said first magnetic support means as at least one first magnetic component having north and south poles;
   f. providing said second magnetic support means with:
      i. at least one second opposing magnetic component which has north and south poles and positioning side second opposing magnetic component in opposing magnetic relationship to said first magnetic component in a manner that poles of said second opposing magnetic component and said first magnetic component of like polarity are vertically spaced from each other, and facing each other, to create a magmatic repelling force therebetween;
      ii. at least one second linking magnetic component which has north and south poles, and with the vehicle in the operating position, positioning said second linking magnetic component with at least one of the north and south poles of said second linking magnetic component being positioned laterally of, and adjacent to, at least one magnetically opposite one of the north and south poles of the first magnetic component, so that the adjacent and magnetically opposite pole of the first magnetic component form linking lines of flux with the adjacent opposite pole of the second linking magnetic component within a vertical support region, so that with the vehicle at a lower part of said region, magnetic lines of force between said adjacent poles exert an upward force on said vehicle, and, with the vehicle at an upper part of said region, the magnetic lines of force between said adjacent poles exert one of a downward force on said vehicle and a lesser upward force on said vehicle;

wherein the north and south poles of said first magnetic component are vertically aligned with one on top the other, and the north and south poles of the second linking magnetic component are vertically aligned with one on top the other.

20. The method as recited in claim 19, wherein both of the north and south poles of the second linking magnetic component are positioned laterally adjacent to both of the south and north poles, respectively, of the first magnetic component to form linking lines of flux therebetween.

* * * * *